United States Patent
Nihei et al.

(10) Patent No.: US 7,119,532 B2
(45) Date of Patent: Oct. 10, 2006

(54) SYSTEMS AND METHODS FOR DETECTING OF ABNORMALITY IN MAGNETIC ROTORS

(75) Inventors: Toshihisa Nihei, Mishima (JP); Toyoharu Katsukura, Kariya (JP); Junji Mizutani, Obu (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 230 days.

(21) Appl. No.: 10/765,121

(22) Filed: Jan. 28, 2004

(65) Prior Publication Data

US 2004/0263160 A1 Dec. 30, 2004

(30) Foreign Application Priority Data

Feb. 17, 2003 (JP) .............................. 2003-038553

(51) Int. Cl.
*G01P 3/44* (2006.01)
(52) U.S. Cl. ..................... 324/174; 324/166; 702/148
(58) Field of Classification Search ............. 324/207.2, 324/207.21, 207.25, 174, 166, 173, 178, 324/179; 702/151, 148, 145, 142
See application file for complete search history.

(56) References Cited

U.S. PATENT DOCUMENTS

| | | | |
|---|---|---|---|
| 5,148,368 A | | 9/1992 | Okubo |
| 5,541,859 A | | 7/1996 | Inoue et al. |
| 6,204,658 B1 | | 3/2001 | Stanusch et al. |
| 6,675,124 B1 * | | 1/2004 | Koga ........................ 702/151 |
| 6,778,939 B1 * | | 8/2004 | Sanpei et al. ................ 702/151 |
| 6,894,484 B1 * | | 5/2005 | Takizawa et al. ........... 324/174 |

FOREIGN PATENT DOCUMENTS

| | | |
|---|---|---|
| DE | 40 25 045 A1 | 2/1991 |
| DE | 44 09 846 A1 | 9/1994 |
| DE | 44 28 347 A1 | 2/1996 |
| DE | 197 49 791 A1 | 5/1999 |
| EP | 0 916 954 B1 | 8/2002 |
| JP | 56-54359 * | 5/1981 |
| JP | A 03-59416 | 3/1991 |
| JP | A-03-067771 | 3/1991 |
| JP | A-06-270618 | 9/1994 |
| JP | A-06-308139 | 11/1994 |
| JP | A 07-329759 | 12/1995 |
| JP | A-11-271348 | 10/1999 |

\* cited by examiner

*Primary Examiner*—Jay M. Patidar
(74) *Attorney, Agent, or Firm*—Oliff & Berridge, PLC

(57) ABSTRACT

A magnetic rotation detector includes a magnetic rotor having magnetic bodies, a detecting body that detects a change in magnetic flux that is caused by the magnetic bodies as the magnetic rotor rotates; and an abnormality determination portion that monitors an apparent fluctuation in rotational speed of the magnetic rotor based on a result detected by the detecting body and that determines that the magnetic rotor is in an abnormal state if the fluctuation occurs at a specific position of the magnetic rotor. The abnormality determination portion detects the occurrence of the fluctuation at the specific position of the magnetic rotor by making a determination on a distance between apparent positions of the magnetic bodies which correspond to the apparent fluctuation in rotational speed and calculates the distance on the basis of a product of an interval of generation of noise in an output signal detected by the detecting body and a rotational speed of the magnetic rotor at the time of generation of noise.

13 Claims, 6 Drawing Sheets

SYSTEMS AND METHODS FOR DETECTING OF ABNORMALITY IN MAGNETIC ROTORS

The disclosure of Japanese Patent Application No. 2003-38553 filed on Feb. 17, 2003 including the specification, drawings, and abstract is incorporated herein by reference in its entirety.

BACKGROUND OF THE INVENTION

1. Field of Invention

The invention relates to a magnetic rotation detector used to detect a rotational speed of a wheel of a vehicle, a vehicle control apparatus employing the magnetic rotation detector, and a method of making a determination on an abnormality in a magnetic rotor.

2. Description of Related Art

A magnetic rotation sensor is known as a device for detecting a rotational speed of a wheel in a vehicle (e.g., see Japanese Patent Application Laid-Open No. 3-59416 (pages 3 and 4, FIG. 1)). A magnetic rotation sensor of this kind is composed of magnetic bodies and a detector. The magnetic bodies are disposed at equal intervals on an outer periphery portion of a rotor that rotates in synchronization with an object whose rotational speed is to be detected. The detector is a pick-up such as a hall device or the like, and is disposed outside the rotor while facing it. If the rotor rotates, the magnetic bodies disposed on the outer periphery of the rotor cause a change in magnetic flux around the pick-up. The pick-up detects the change in magnetic flux and outputs a signal. Thus, movements of the magnetic bodies causing the change in magnetic flux, namely, rotation of the rotor can be detected on the basis of the signal output from the pick-up.

A magnetic rotation sensor of this kind is disposed on a rotational axle for wheels or the like. However, since a structure for mounting the magnetic rotation sensor cannot be sealed, foreign matters inevitably penetrate into the sensor. If iron fragments or the like have penetrated thereinto, they may adhere to the magnetic bodies disposed on the outer periphery portion of the rotor and may disturb a change in magnetic flux. If the change in magnetic flux is thus disturbed, a fluctuation in rotational speed is erroneously detected even though the rotor itself rotates at a constant speed.

SUMMARY OF THE INVENTION

It is an object of the invention to provide a magnetic rotation detector capable of detecting adhesion of foreign matters to magnetic bodies of a rotor, a vehicle control apparatus employing the magnetic rotation detector, and a method of making a determination an abnormality in a magnetic rotor.

A first aspect of the invention relates to a magnetic rotation detector including a magnetic rotor having magnetic bodies disposed on an outer periphery portion thereof at intervals of a predetermined distance and a detecting body that detects a change in magnetic flux that is caused as the magnetic rotor rotates. The magnetic rotation detector further includes an abnormality determination portion that monitors an apparent fluctuation in rotational speed of the magnetic rotor based on a result detected by the detecting body and that determines that the magnetic rotor is in an abnormal state if the fluctuation occurs at a specific position of the magnetic rotor.

If an abnormality such as adhesion of foreign matters to a certain one of the magnetic bodies of the magnetic rotor or the like occurs, a change in magnetic flux at a position of that magnetic body is different from a normal change. This substantially brings about the same result as in a case where a fluctuation in rotational speed occurs at the position. Namely, an apparent fluctuation in rotational speed is caused. On the contrary, if an apparent fluctuation in rotational speed is detected at a specific position, it is estimated that there is a state of the abnormality as mentioned above.

The magnetic bodies which correspond to the apparent fluctuation in rotational speed may actually be one magnetic body, because the magnetic body passes in front of the detecting body more than once.

A second aspect of the invention relates to a vehicle control apparatus including a plurality of wheel speed detectors, each of which detect a wheel speed of a corresponding wheel by means of the aforementioned magnetic rotation detector and a rough road determination portion that makes a determination on a rough road state of a road surface on the basis of the wheel speed measured by the wheel speed detector. In this vehicle control apparatus, the rough road determination portion makes a determination on a rough road with a reduced degree of reflection of a wheel speed detected using the magnetic rotation detector regarded as abnormal, if the abnormality determination portion determines that the magnetic rotor is abnormal.

A third aspect of the invention relates to a vehicle control apparatus including a plurality of wheel speed detectors, each of which detect a wheel speed of a corresponding wheel by means of the aforementioned magnetic rotation detector and a vehicle speed determination portion that makes a determination on a vehicle speed on the basis of the wheel speeds respectively measured by the wheel speed detectors. In this vehicle control apparatus, the vehicle speed determination portion makes a determination on a vehicle speed with a reduced degree of reflection of a wheel speed detected using the magnetic rotation detector regarded as abnormal, if the abnormality determination portion determines that the magnetic rotor is abnormal.

A fourth aspect of the invention relates to a vehicle control apparatus including a wheel speed detector that employs the aforementioned magnetic rotation detector and a vehicle control portion that controls the behavior of a vehicle on the basis of a wheel speed measured by the wheel speed detector. The vehicle control portion inhibits vehicle control from being positively performed if the abnormality determination portion determines that the magnetic rotor is abnormal.

In the case where an abnormality in the magnetic rotor is detected, a wheel speed measured by the magnetic rotation detector is considered to be low in reliability. If determinations on a rough road and a vehicle speed are made using a detected result considered to be low in reliability or if vehicle control is performed using a detected result considered to be low in reliability, the reliability of the determinations or the control may not be maintained. In such cases, therefore, erroneous determinations or erroneous control operations are obviated by suspending the determinations, excluding the detected result from the premise of the determinations, or preventing the control from being positively performed.

A fifth aspect of the invention relates to a method of making a determination on an abnormality in a magnetic rotor having magnetic bodies that are disposed on an outer periphery portion thereof at intervals of a predetermined distance. This method includes the steps of detecting a change in magnetic flux that is caused by the magnetic bodies as the magnetic rotor rotates, monitoring an apparent fluctuation in rotational speed of the magnetic rotor on the basis of the detected change in magnetic flux, determining whether the fluctuation in rotational speed occurs at a specific position of the magnetic rotor, and determining that the magnetic rotor is in an abnormal state if it is determined that the fluctuation in rotational speed occurs at the specific position of the magnetic rotor.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
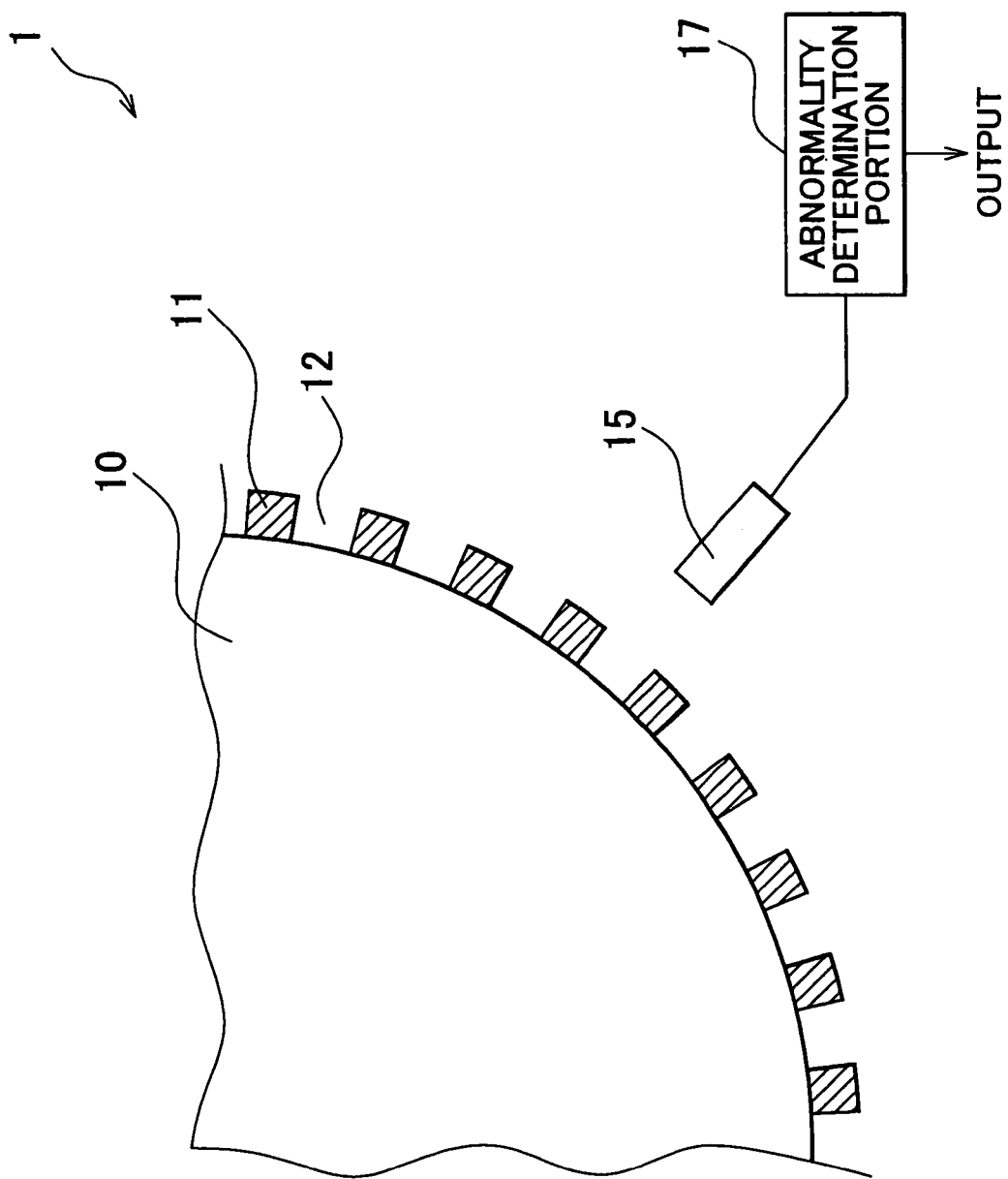
FIG. 1 is a schematic view of a magnetic rotation detector in accordance with an embodiment of the invention.

Hereinafter, preferred embodiments of the invention will be described in detail with reference to the accompanying drawings. To facilitate the understanding of the following description, like reference numerals are used to represent like component elements in the drawings insofar as possible, and repetition of the same description will be avoided.

FIG. 1 is a schematic view of a magnetic rotation detector in accordance with one embodiment of the invention. It is to be noted herein that only part of a magnetic rotor 10 is shown in FIG. 1. The magnetic rotor 10 is in the shape of a circular disc. Magnets 11 are disposed on an outer periphery of the magnetic rotor 10 at equal intervals while protruding therefrom. Each of gaps 12 is formed between adjacent ones of the magnets 11. A pick-up (detecting body) 15 is contiguous to the outer periphery of the magnetic rotor 10, and is fixed to such a position that the pick-up 15 stands still while the magnetic rotor 10 rotates. As the pick-up 15, various sensors whose output signals change in amplitude in accordance with a change in magnetic flux in their surroundings can be employed. For instance, a sensor utilizing the phenomenon of electromagnetic induction, a sensor utilizing Hall effect, a sensor utilizing magnetoresistance, or the like can be preferably employed. A signal from the pick-up 15 is output via an abnormality determination portion 17. The abnormality determination portion 17 is composed of a CPU, a memory, and the like, and assesses the validity of a signal output from the pick-up 15. If there is an abnormality, the abnormality determination portion 17 either stops a signal based on the signal output from the pick-up 15 from being output, or adds a signal indicating the abnormality to the signal output from the pick-up 15 and outputs a resultant signal.

Figure 2:
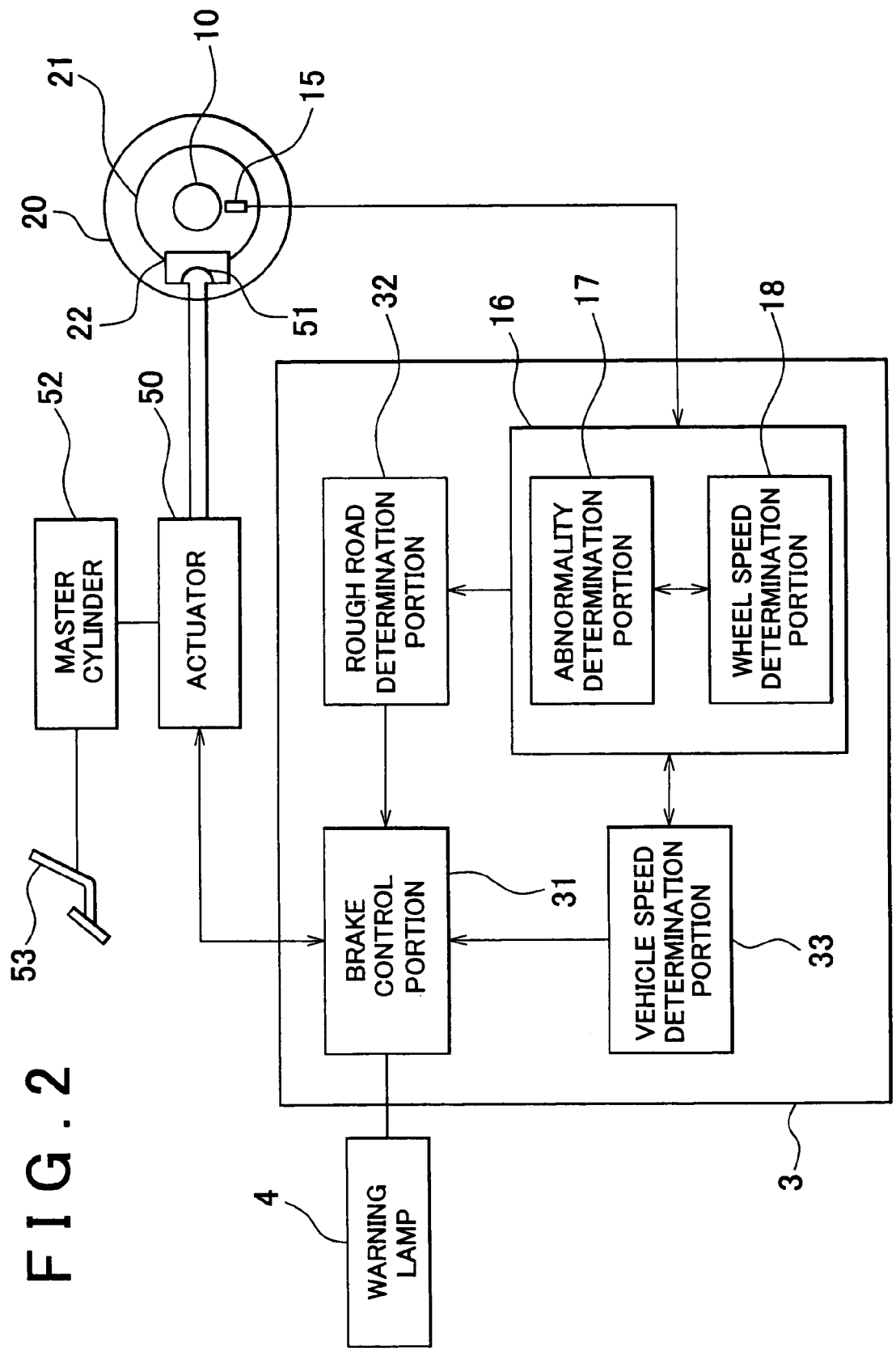
FIG. 2 is a block diagram showing the construction of a vehicle control apparatus in accordance with the magnetic rotation detector shown in FIG. 1 is used as a wheel speed sensor.

FIG. 2 is a block diagram showing the construction of a vehicle behavior control apparatus in accordance with the embodiment in which the magnetic rotation detector is used as a wheel speed sensor. Although there are four wheels, only one of them is shown in FIG. 2 for the sake of simplification.

A rotational axle for a wheel 20 is fitted with a brake disk 21 and also with the magnetic rotor 10. The pick-up 15 is disposed on a vehicle body that is not coupled to the rotational axle for the wheel 20. A brake caliper 22 for applying a braking force is disposed such that the brake disk 21 is sandwiched by the brake caliper 22. The brake caliper 22 is fitted with a wheel cylinder 51, which hydraulically operates the brake caliper 22.

The wheel cylinder 51 for each of the wheels is connected to an actuator 50 for controlling hydraulic pressure. The actuator 50 is connected to a brake pedal 53 via a master cylinder 52.

A vehicle control ECU 3 is composed of a CPU, a memory, and the like. Programs for controlling the vehicle hardware-wise or software-wise are stored in the vehicle control ECU 3. A wheel speed determination means 16 is provided in the vehicle control ECU 3. The wheel speed determination means 16 has the above-mentioned abnormality determination portion 17 and a wheel speed determination portion 18 that makes a determination on a speed of each of the wheels on the basis of a signal output from the pick-up 15. The vehicle control ECU 3 is further provided with a rough road determination portion 32, a vehicle speed determination portion 33, and a brake control portion 31. The rough road determination portion 32 makes a determination on a state of a road surface on which the vehicle runs, on the basis of a wheel speed determined by the wheel speed determination means 16. The vehicle speed determination portion 33 makes a determination on a moving speed of the vehicle, that is, a vehicle speed. The brake control portion 31 controls a braking force applied to each of the wheels, by controlling the actuator 50 on the basis of detected results. A warning lamp 4 is connected to the brake control portion 31. In the case mentioned herein, the above-mentioned abnormality determination portion 17 is built in the wheel speed determination means 16 installed in the vehicle control ECU 3. However, the abnormality determination portion 17 or the entire wheel speed determination means 16 may be provided independently of the vehicle control ECU 3.

Figure 3:
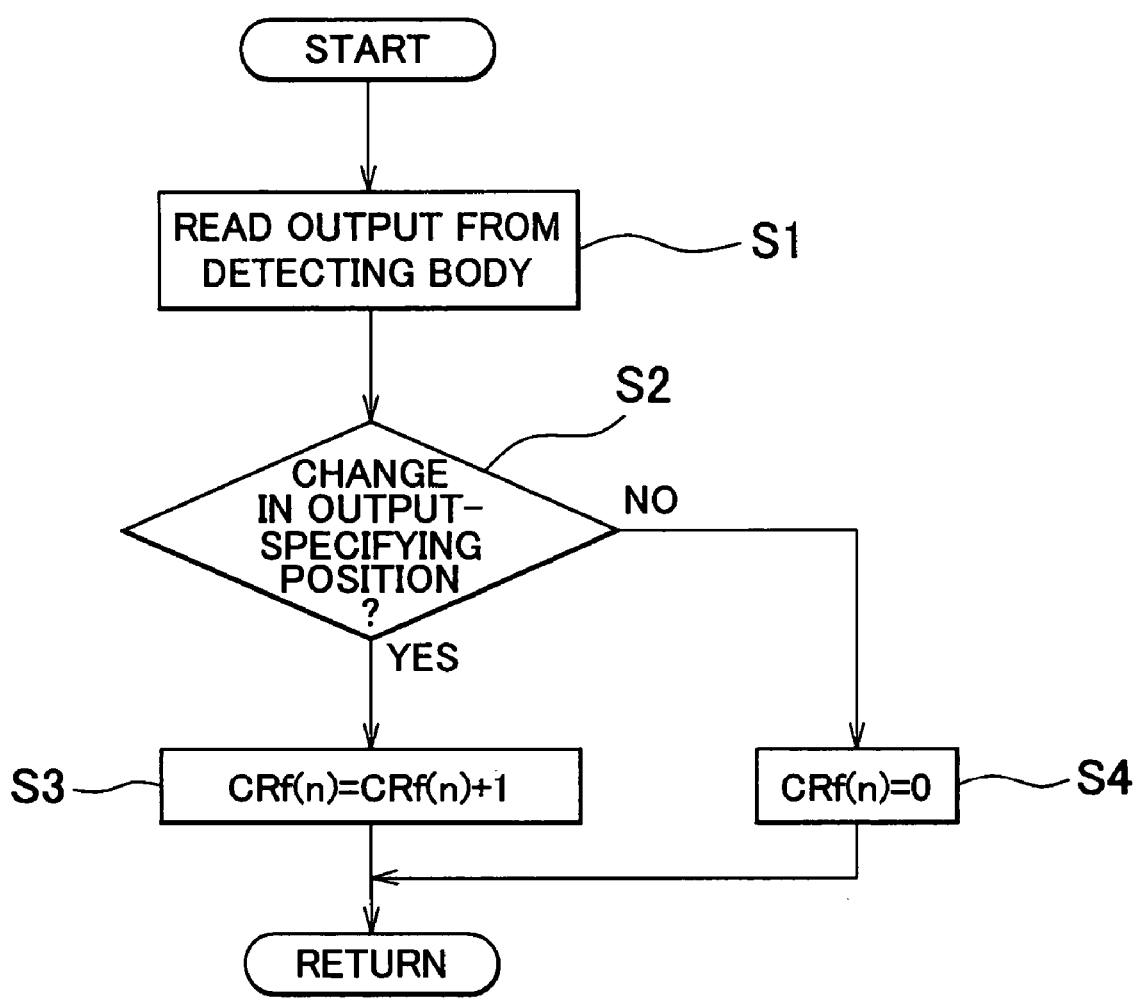
FIG. 3 is a flowchart showing operation of the magnetic rotation detector shown in FIG. 1.
Figure 4:
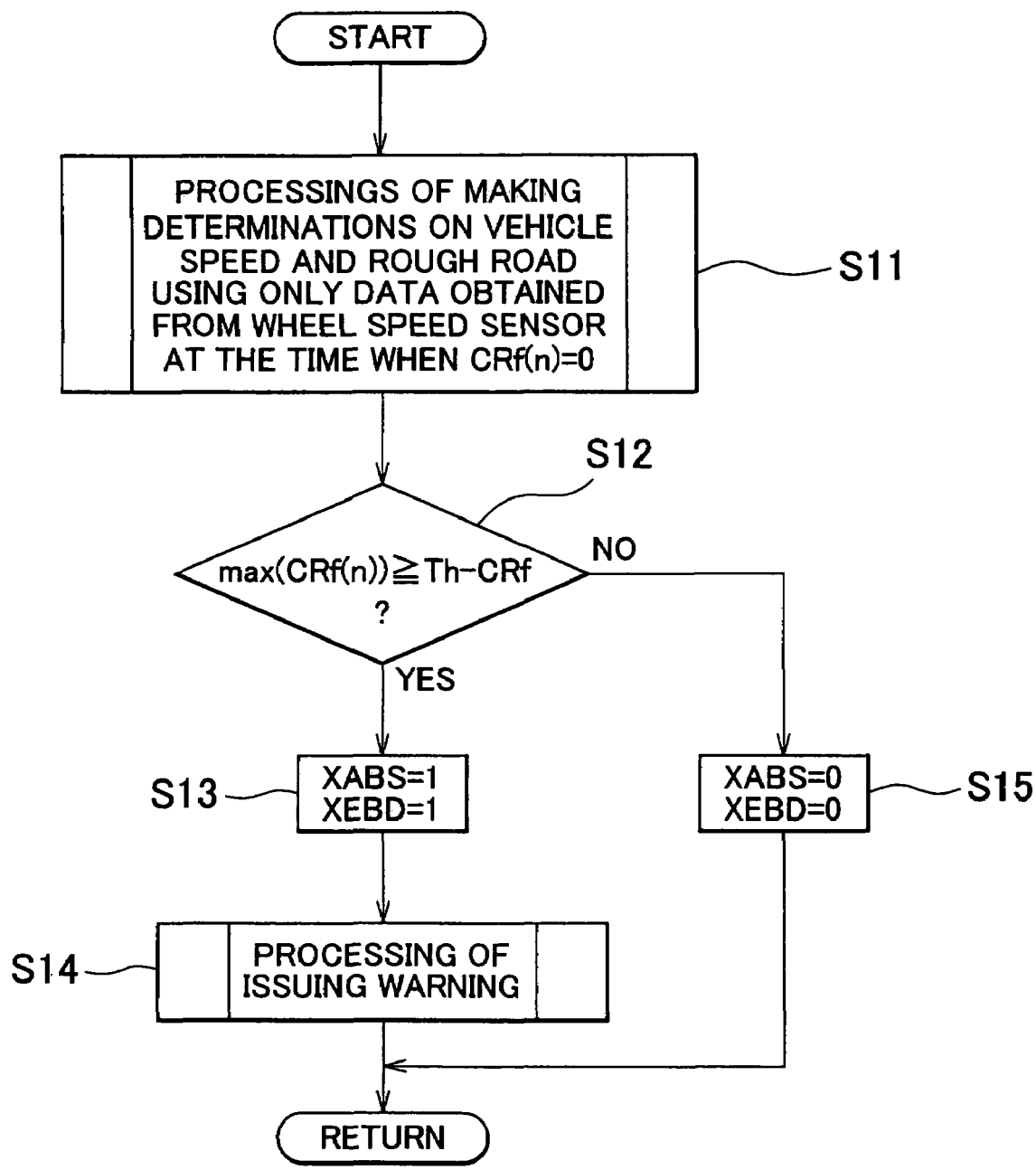
FIG. 4 is a flowchart showing operation of the vehicle control apparatus shown in FIG. 2.

Next, operation of the vehicle behavior control apparatus will be described in conjunction with operation of the wheel speed sensor, namely, the magnetic rotation detector in accordance with the embodiment. FIG. 3 is a flowchart showing the operation of the magnetic rotation detector as a wheel speed sensor. FIG. 4 is a flowchart showing operation of the vehicle behavior control apparatus based on a result detected by the wheel speed sensor. The vehicle control ECU 3 regularly performs the processings shown in FIGS. 3 and 4 at predetermined timings after an ignition key for the vehicle has been turned on.

First of all, operation of the magnetic rotation detector will be described. The wheel speed determination means 16 first reads a signal output from the pick-up 15 as a detecting body (step S1). The magnetic rotor 10 is fixed coaxially with the wheel 20 and thus rotates in synchronization with rotation thereof. As the magnetic rotor 10 rotates, the magnets 11 and the gaps 12 alternately pass a space in front of the pick-up 15, whereby the magnetic flux around the pick-up 15 periodically changes. A signal output from the pick-up 15 changes in accordance with this change in magnetic flux. Then, the abnormality determination portion 17 checks on the basis of the output signal whether or not an apparent fluctuation in rotational speed of the magnetic rotor 10 has occurred at a specific position thereof (step S2).

More specifically, if a derivative value DVX (an apparent wheel acceleration) of a wheel speed calculated by the wheel speed determination portion 18 on the basis of a signal output from the pick-up 15 is equal to or smaller than −10 G (equal to or larger than 10 G as an absolute value), the derivative value is regarded as noise of the output signal and a noise generation interval of the output signal is defined as TFE. Such an apparent wheel acceleration of a large negative value is produced if the pick-up 15 cannot detect the magnets 11 due to the disturbance of a change in magnetic flux resulting from adhesion of metal fragments or the like. A wheel speed at the time of generation of noise of the output signal is set as VWFE. It is to be noted, however, that this wheel speed is obtained before making a correction as to two or more of the wheels. A wheel speed at the moment when noise is generated is susceptible to the influence of the noise and thus imprecise. Therefore, it is not preferred that this wheel speed be used for a determination as a wheel speed at the time of generation of noise. Hence, it is appropriate that a wheel speed at a timing which is unsusceptible to the influence of noise and which is close to a timing when noise is generated, for example, a wheel speed at a timing which is a predetermined time before or after the timing when noise is generated or an average wheel speed within a predetermined period contiguous to the timing when noise is generated be used as a wheel speed VWFE at the timing when noise is generated. The predetermined time and predetermined period are preferably set shorter than a time and period that are required for one turn of the wheels (one turn of the magnetic rotor 10 to be exact) in the case where the vehicle runs at a maximum speed.

Then, a product of TFE and VWFE (i.e., TFE×VWFE) is compared with a determination coefficient KFE. If a relationship $0.8 \times KFE \leq TFE \times VWFE \leq 1.2 \times KFE$ is established, it is determined that there is a fluctuation in rotational speed at a specific position. The product TFE×VWFE is defined as a value corresponding to a distance that is covered by the vehicle between two timings when noise is generated in a signal output from the pick-up 15. This value corresponds to a distance stretching along the outer periphery of the magnetic rotor 10 between magnetic bodies 14 that have generated noise. The determination coefficient KFE is defined as a value corresponding to the length of an outer periphery of a tire. In fact, therefore, the value corresponding to the distance that is covered by the vehicle between the timings when noise is generated represents a distance that has been increased in accordance with a ratio between a diameter of the tire and a diameter of the magnetic rotor 10. If the values TFE and VWFE are different in unit system, it is appropriate to set the coefficient KFE in consideration of a conversion factor. When the vehicle runs at a low speed, the wheels rotate at a low speed and signals output from the pick-up 15 may not be stabilized. In such a case, for example, in the case where the vehicle speed is equal to or lower than 10 km/h, it is preferable to abstain from making this determination on the occurrence of an abnormality.

If it is determined that there is a fluctuation at the specific position of the magnetic rotor 10, a shift to step S3 is made. A value of a counter CRf(n) is increased by 1 in step S3, whereby the present routine is terminated. The counter CRf(n) assumes a value n=1 to 4, which is individually set for each wheel sensor. This value represents a duration period when the fluctuation at the specific position is generated in the case where the occurrence of an abnormal state is confirmed on the ground that the fluctuation is continuously detected. If it is determined that there is no fluctuation at the specific position, a shift to step S4 is made. The value of the counter CRf(n) is reset as 0, whereby the present routine is terminated.

Adhesion of iron fragments or the like to the magnets 11 is considered to be a factor for the occurrence of a fluctuation in an output signal (an apparent fluctuation in wheel speed) at a specific position of the wheel, that is, the magnetic rotor 10. A change in magnetic flux detected by the pick-up 15 is caused in accordance with a pitch at which the magnets 11 are disposed with respect to the pick-up 15. Therefore, if iron fragments adhere to the magnets 11 as described above, no change in magnetic flux is caused at that position. A state created as a result is different from a normal state where adhesion of iron fragments or the like has not occurred. Thus, a rotational state of the magnetic rotor 10 calculated on the basis of this change in magnetic flux is different from an inherent rotational state of the magnetic rotor 10, and a seemingly genuine fluctuation in rotational speed is caused at a specific position on the outer periphery of the magnetic rotor 10. Accordingly, if such a fluctuation is detected at the specific position, the abnormality determination portion 16 presumes that iron fragments have adhered to the magnets 11, and sets the counter CRf(n) as a positive value so as to inhibit a rotational fluctuation from being erroneously detected.

Next, operation of the vehicle behavior control apparatus based on a result detected by the wheel speed sensor will be described. First of all, the rough road determination portion 32 and the vehicle speed determination portion 33 respectively make determinations on a rough road and a vehicle speed, using only signals that are output from the wheel speed sensor and that correspond to a state where no apparent rotational fluctuation has been detected at a specific position, i.e., CRf(n)=0 (step S11). The determination on a rough road is designed, for example, to estimate a state of roughness on a road surface in accordance with an irregular amount of a fluctuation in wheel acceleration. The determination on a vehicle speed is made by carrying out a conversion from an average wheel speed (rotational speed) using a known tire diameter.

It is determined in step S12 whether or not a maximum value of the counter CRf(n) has become equal to or larger than a threshold Th-CRf. This threshold is set as a value corresponding to a case where an apparent fluctuation in wheel speed at a specific position has continuously been detected for a predetermined period or more. For example, the threshold is set as a value corresponding to a case where such an apparent fluctuation has continuously been detected for 15 seconds.

If it is determined that an apparent fluctuation in wheel speed at the specific position has lasted for the predetermined period or more, a shift to step S13 is made. In step S13, a flag XABS for prohibiting ABS (antilock braking system) control and a flag XEBD for prohibiting EBD (electronic brake-force distribution) control are set as 1, namely, a value indicating a state of prohibition. Then, a warning processing of advising a driver of the detection of an abnormality in the wheel speed sensor by means of the warning lamp 4 is performed (step S14). At this moment, it is preferable to feed a result of the detection of the abnormality into a diagnostic system (not shown) and to store the result into the diagnostic system, because the facility in repair and inspection is enhanced.

If it is determined that the apparent rotational fluctuation in wheel speed at the specific position has not lasted for the predetermined period or more, a shift to step S15 is made. In step S15, the flag XABS for prohibiting ABS control and the flag XEBD for prohibiting EBD control are set as 0, namely, a value indicating a state of nullified prohibition. The present routine is thereby terminated.

If the driver operates the brake pedal 53, a hydraulic pressure corresponding to an operation amount of the brake pedal 53 is applied to the actuator 50 from the master cylinder 52. If the flags XABS and XEBD are set as 0, the brake control portion 31 performs ABS control and EBD control. More specifically, the brake control portion 31 performs EBD control to control a braking force to be applied to each of the wheels on the basis of a vehicle speed, a wheel speed, and a road surface state during a braking operation. Furthermore, if the braking force to be applied is large, the brake control portion 31 performs ABS control to apply a suitable braking force to each of the wheels while preventing the wheels from being locked.

According to this embodiment, if the abnormality determination portion 17 determines that there is an abnormality in the wheel speed sensor (the magnetic rotation detector), a result detected by the wheel speed sensor that has been regarded as abnormal is excluded from data to be used in making a determination on a rough road or a determination on a vehicle speed. Therefore, the use of an erroneous value obtained from the wheel speed sensor is avoided. As a result, determinations on a rough road and a vehicle speed can be made with high precision. In addition, since vehicle behavior control operations such as ABS control, EBD control, and the like are prohibited for the duration of an abnormality, the possibility of controlling the behavior of the vehicle using an erroneous value obtained from the wheel speed sensor is eliminated. As a result, the effect of inhibiting the performance of erroneous control is achieved.

In the example described herein, a result detected by the wheel speed sensor that has been regarded as abnormal is excluded from data to be used in making a determination on a rough road or a determination on a vehicle speed. However, it is not absolutely required that a result detected by the wheel speed sensor as an abnormal result be completely excluded from data to be used in making those determinations. That is, the result may be used with its degrees of contribution to the determinations on a rough road and a vehicle speed being lowered. In this case, the degrees of contribution of a result detected by the wheel speed sensor as a normal result to the determinations on a rough road and a vehicle speed are set higher than usual. Therefore, the effect of inhibiting an erroneous determination from being made is more fully achieved in comparison with a case where a result detected by the wheel speed sensor as an abnormal result is directly used. It is not absolutely required either that the vehicle behavior control operations be completely prohibited. That is, they may be performed gently instead of being performed positively. If the control operations are gently performed as described herein, the behavior of the vehicle can be corrected while inhibiting the performance of erroneous control. In this case, the performance of the control operations may be rendered gentle (the rate of change in control amount for controlling a vehicle based on a signal output from the pick-up 15 when it is determined that the magnetic rotor 10 is in an abnormal state may be reduced) in accordance with a duration period (a value of the aforementioned counter CRf(n)) of a determination on the occurrence of an abnormality. The control operations may be prohibited if a predetermined duration period is exceeded.

Figure 5A:
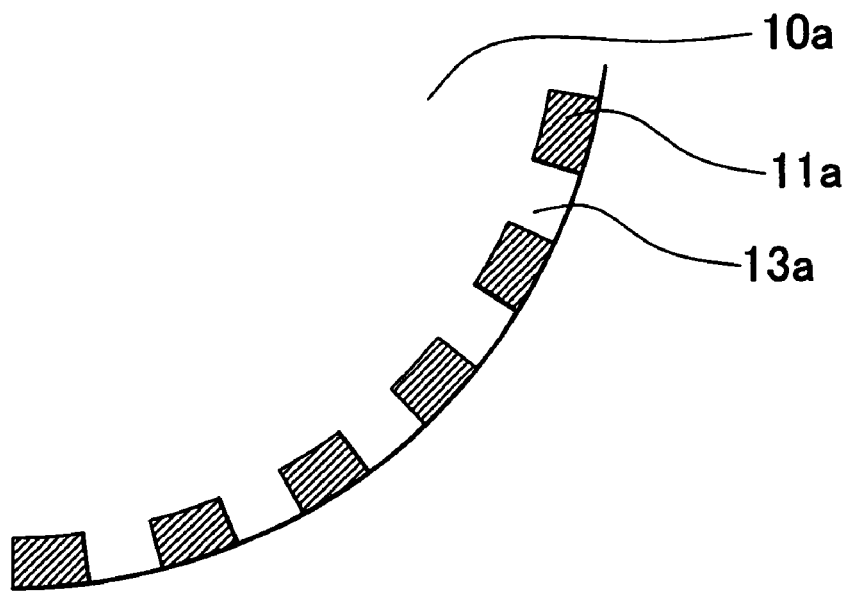
FIGS. 5A to 5C are partial front views showing arrangements of magnets in a magnetic rotor in other embodiments of the magnetic rotation detector shown in FIG. 1.
Figure 5B:
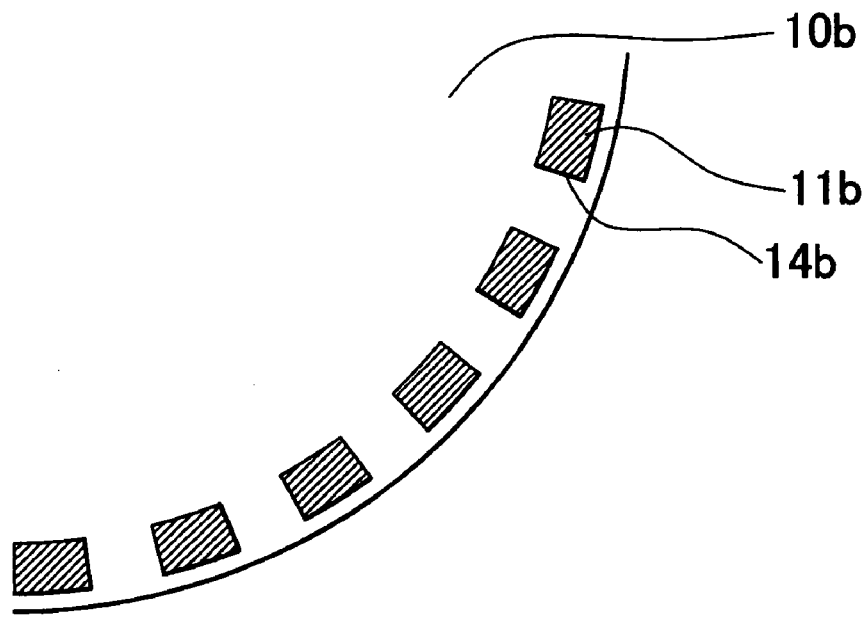
Figure 5C:
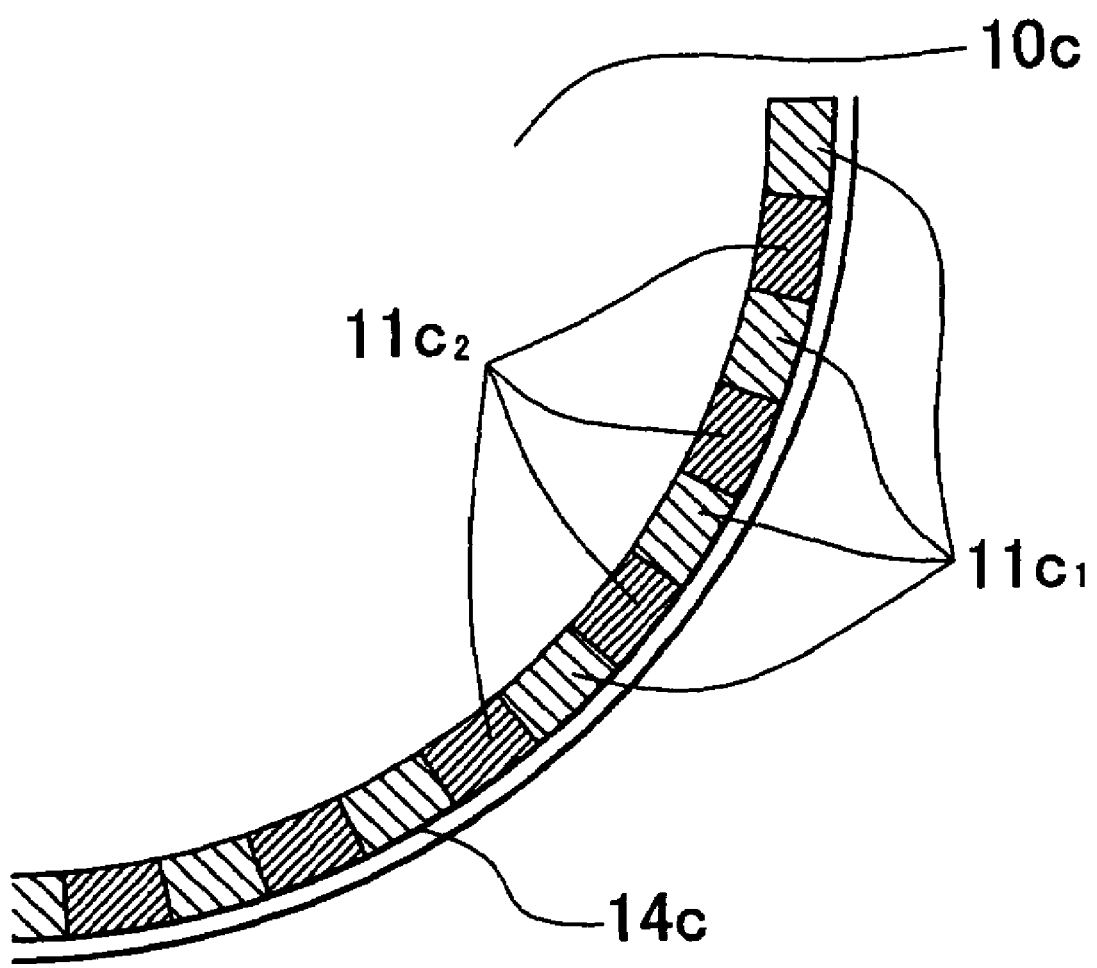

Construction of a magnetic rotor of a magnetic rotation detector in accordance with the invention is not limited to the magnetic rotor 10 shown in FIG. 1. For example, constructions shown in FIGS. 5A, 5B, and 5C may be adopted. In the construction shown in FIG. 5A, each of magnets 11a is disposed between adjacent ones of teeth 13a of a main body of a gear-shaped magnetic rotor 10a. In the construction shown in FIG. 5B, each of magnets 11b is fitted in a corresponding one of grooves 14b that are formed in the vicinity of an outer periphery of a magnetic rotor 10b. In the construction shown in FIG. 5C, magnets 11C1 and magnets 11c2 that are mutually different in arrangement of magnetic poles are alternately disposed in grooves 14c that are formed in a lateral face of a magnetic rotor 10c in a region close to an outer periphery thereof. In any case, a rotational speed of the magnetic rotor 10a, 10b, or 10c can be detected by using the pick-up 15 to detect a change in magnetic flux occurring in the outer periphery portion as a result of rotation of the magnetic rotor 10a, 10b, or 10c.

The example described hitherto handles a case where a magnetic rotation detector in accordance with the invention is used as a wheel speed sensor. However, the magnetic rotation detector in accordance with the invention can also be used as an on-vehicle or off-vehicle sensor for detecting a rotational speed of an internal combustion engine or as any of other varieties of sensors for detecting rotation. Even in the case where the magnetic rotation detector is used as a wheel speed sensor, it is not required that a magnetic rotor be disposed coaxially with a wheel. That is, it is also appropriate that the magnetic rotor be disposed on a shaft that rotates while increasing or reducing a rotational speed of the wheel. In this case as well, an apparent rotational fluctuation caused at a specific position of the magnetic rotor is detected. As described above, as a method of detecting a specific position of the magnetic rotor where an apparent rotational fluctuation is caused, the specific position may be detected as a circumferential position of an object to be measured (a tire in the aforementioned case). The specific position may also be specified as an angular position of an object to be measured, or as a circumferential or angular position of the magnetic rotor itself.

As described hitherto, the embodiments of the invention are designed to monitor a signal output from the pick-up and to determine that there is an abnormality such as adhesion of metal fragments or the like to a certain one of magnetic bodies at a specific position, if an apparent fluctuation in rotation of the magnetic rotor is caused in the magnetic body at the specific position. Thus, a determination on the occurrence of an abnormality such as adhesion of metal fragments or the like to the magnetic bodies of the magnetic rotor can be made reliably. Also, the occurrence of erroneous detection during detection of rotation, the occurrence of errors in various determinations based on a detected rotational speed, a speed, and the like, and the occurrence of errors in vehicle control operations can be inhibited.

What is claimed is:

1. A magnetic rotation detector comprising:
a magnetic rotor having magnetic bodies disposed on an outer periphery portion thereof at intervals of a predetermined distance;
a detecting body that detects a change in magnetic flux that is caused by the magnetic bodies as the magnetic rotor rotates; and
an abnormality determination portion that monitors an apparent fluctuation in rotational speed of the magnetic rotor based on a result detected by the detecting body and that determines that the magnetic rotor is in an abnormal state if the fluctuation occurs at a specific position of the magnetic rotor,
wherein the abnormality determination portion detects the occurrence of the fluctuation at the specific position of the magnetic rotor by making a determination on a distance between apparent positions of the magnetic bodies which correspond to the apparent fluctuation in rotational speed, and calculates the distance on the basis of a product of an interval of generation of noise in an output signal detected by the detecting body and a rotational speed of the magnetic rotor at the time of generation of noise.

2. The magnetic rotation detector according to claim 1, wherein
the abnormality determination portion determines that the magnetic rotor is abnormal if the apparent fluctuation in rotational speed at the specific position lasts for a predetermined period or more.

3. The magnetic rotation detector according to claim 1, wherein
the abnormality determination portion determines that there is the apparent fluctuation in rotational speed if an absolute value of a derivative value of a rotational speed of the magnetic rotor exceeds a predetermined value.

4. The magnetic rotation detector according to claim 1, wherein
the abnormality determination portion estimates that the fluctuation in rotational speed at the specific position is an abnormality resulting from adhesion of metal fragments to the magnetic rotor.

5. The magnetic rotation detector according to claim 1, wherein
the abnormality determination portion does not determine that the magnetic rotor is in an abnormal state even if the fluctuation occurs at the specific position of the magnetic rotor, as long as the magnetic rotor rotates at a rotational speed lower than a predetermined value.

6. A vehicle control apparatus comprising:
a plurality of wheel speed detectors, each of which detect a wheel speed of a corresponding wheel by means of the magnetic rotation detector according to claim 1; and
a rough road determination portion that makes a determination on a rough road state of a road surface on the basis of the wheel speeds respectively measured by the wheel speed detectors,
wherein the rough road determination portion makes a determination on a rough road with a reduced degree of contribution of the wheel speeds detected using the magnetic rotation detector regarded as abnormal if the abnormality determination portion determines that the magnetic rotor is in an abnormal state.

7. The vehicle control apparatus according to claim 6, wherein
the rough road determination portion makes a determination on a rough road after excluding the wheel speed detected using the magnetic rotation detector regarded as abnormal, if the abnormality determination portion determines that the magnetic rotor is in an abnormal state.

8. A vehicle control apparatus comprising:
a plurality of wheel speed detectors, each of which detect a wheel speed of a corresponding wheel by means of the magnetic rotation detector according to claim 1; and
a vehicle speed determination portion that estimates a vehicle speed on the basis of the wheel speeds respectively measured by the wheel speed detectors,
wherein the vehicle speed determination portion estimates a vehicle speed with a reduced degree of reflection of the wheel speeds detected using the magnetic rotation detector regarded as abnormal, if the abnormality determination portion determines that the magnetic rotor is in an abnormal state.

9. The vehicle control apparatus according to claim 8, wherein
the vehicle speed determination portion estimates a vehicle speed after excluding the wheel speed detected using the magnetic rotation detector regarded as an abnormal, if the abnormality determination portion determines that the magnetic rotor is in an abnormal state.

10. A vehicle control apparatus of a vehicle, comprising:
a wheel speed detector employing the magnetic rotation detector according to claim 1; and
a vehicle control portion that controls the behavior of a the vehicle on the basis of a wheel speed measured by the wheel speed detector,
wherein the vehicle control portion inhibits vehicle control from being positively performed if the abnormality determination portion determines that the magnetic rotor is in an abnormal state.

11. The magnetic rotation detector according to claim 1, wherein
the abnormality determination portion detects the occurrence of the fluctuation at the specific position of the magnetic rotor by comparing the distance with a value corresponding to a length of an outer periphery of a rotating body that rotates co-axially with the magnetic rotor.

12. A method of making a determination on an abnormality in a magnetic rotor having magnetic bodies that are disposed on an outer periphery portion thereof at intervals of a predetermined distance, comprising:
detecting a change in magnetic flux that is caused by the magnetic bodies as the magnetic rotor rotates;
monitoring an apparent fluctuation in rotational speed of the magnetic rotor on the basis of the detected change in magnetic flux;
determining whether the fluctuation in rotational speed occurs at a specific position of the magnetic rotor by making a determination on a distance between apparent positions of the magnetic bodies which correspond to the apparent fluctuation in rotational speed, and by calculating the distance on the basis of a product of an interval of generation of noise in an output signal detected by the detecting body and a rotational speed of the magnetic rotor at the time of generation of noise: and
determining that the magnetic rotor is in an abnormal state if it is determined that the fluctuation in rotational speed occurs at the specific position of the magnetic rotor.

13. The method of claim 12, wherein determining whether the fluctuation in rotational speed occurs at the specific position of the magnetic rotor comprises comparing the distance with a value corresponding to a length of an outer periphery of a rotating body that rotates co-axially with the magnetic rotor.

* * * * *